Jan. 4, 1927. W. P. CAPPS 1,613,559
VALVE CAGE
Filed July 14, 1926
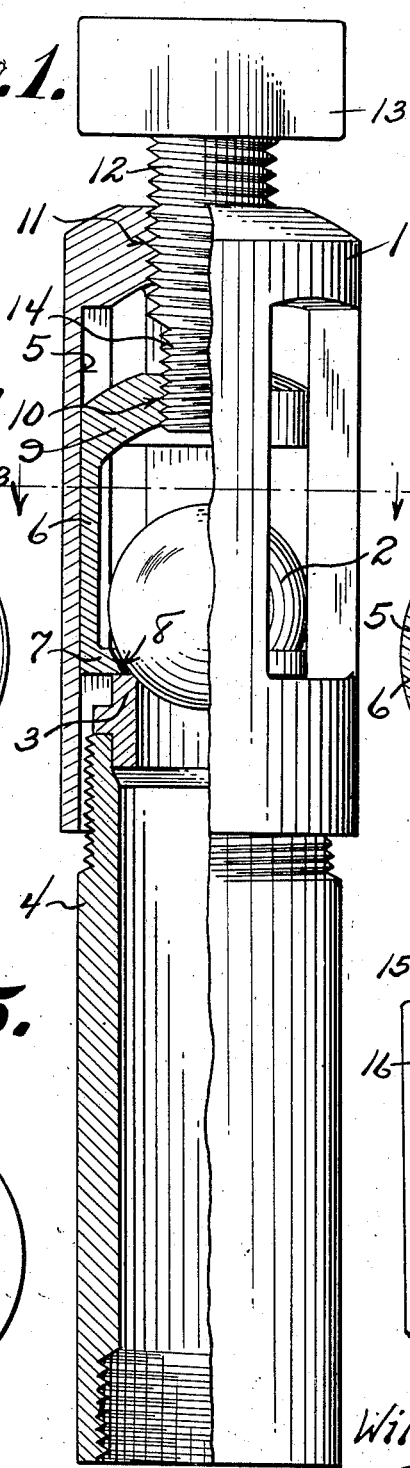
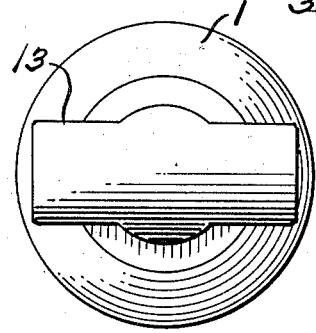
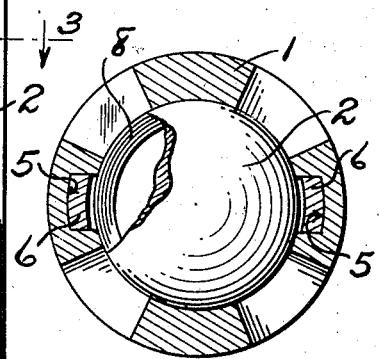
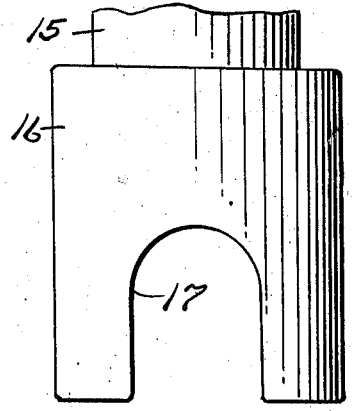
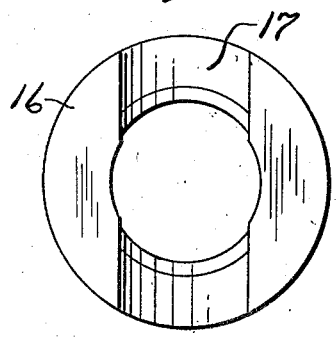
William P. Capps, INVENTOR
BY Victor J. Evans, ATTORNEY Patented Jan. 4, 1927.

1,613,559

UNITED STATES PATENT OFFICE.

WILLIAM P. CAPPS, OF SHREVEPORT, LOUISIANA.

VALVE CAGE.

Application filed July 14, 1926. Serial No. 122,458.

My present invention has reference to oil well pumping devices and has for its purpose the arrangement of means in the cage of the standing valve for influencing the valve to unseat the same so that fluid can flow downwardly through the valve cage when it becomes necessary to change the working barrel, tubing, standing valve, etc.

To the attainment of the above broadly stated object and others which will present themselves as the nature of the invention is better understood, the improvement resides in certain novel features of construction, combination and operative association of parts, a satisfactory embodiment of which is illustrated by the accompanying drawings.

In the drawings:

Figure 1 is a side elevation with parts in section, illustrating the improvement.

Figure 2 is a top plan view.

Figure 3 is a sectional view on the line 3—3 of Figure 2.

Figure 4 is a detail elevation of the lower end of the tubular member carrying the traveling valve.

Figure 5 is a bottom plan view of the device illustrated in Figure 4.

In Figure 1 of the drawings, I have illustrated a cage 1 for the standing valve in an oil well. The cage is of the usual construction, the valve being of the ball type, and indicated by the numeral 2. The valve is normally arranged on its seat 3 and the cage 1 has screwed in its lower end the usual pipe extension 4 which may carry the bit.

The cage is formed on two of its opposite sides, with longitudinally extending depressions 5 in which there are received the parallel arms 6 on a traveler or what I will term a yoke member. The arms 6 of the yoke member have their lower ends inwardly directed, as at 7, providing what I will term fingers. The confronting ends of these fingers 7 are beveled or flared, as at 8, and the ball valve 2 rests between the fingers when seated. The top or connecting element 9 of the yoke has a threaded opening 10 therethrough, and the top of the cage 1 has a threaded opening of a larger diameter which is arranged in a line with the opening 10. Both the openings 10 and the movable yoke and the opening 11 in the top of the cage are threaded, but the said threads are arranged at opposite hand pitches. Screwed through the threaded opening 11 there is the threaded shank 12 of a headed member 13. The shank has an outer reduced extension which is also threaded, as at 14, the threads 14 being of a different hand pitch than the threads 12, and these threads are engaged with the threads in the top of the movable member.

The sucker rod carries the usual traveling valve and secured on the lower end of the cage of the traveling valve, (not shown) there is the pipe member 15 that has a tubular extension 16. This extension is notched at its outer end, as at 17.

To open the standing valve 2 in the cage 1, it is necessary to seat the sucker rod on top of the cage 1, that is, to bring the notch 17 over the head 13 of the screw member. The operator then rotates the rods to the right which revolves the head 13 and the screw shank thereon. This turning of the head will cause the traveler member or yoke to move upwardly in the cage 1, so that its fingers will raise the valve 2 above its seat 3, thus permitting the fluid to be automatically discharged out of the well tubing back into the well, through the pipe or tube 4. In this manner it will be noted that I save fluid which is usually wasted when the tube is pulled out of the well to change the working valve.

The simplicity of my improvement and the advantages thereof will, it is thought, be perfectly apparent to those skilled in the art to which such invention relates when the foregoing description has been carefully read in connection with the accompanying drawings, it being, of course, understood that I do not wish to be restricted to the precise structural details herein set forth and may make such changes therefrom as fairly fall within the scope of what I claim.

Having described the invention, I claim:

1. In an oil well pump, a standing valve and a traveling valve having a jaw member extending from the lower end thereof, a movable yoke in the cage for the standing valve having fingers extending inwardly therefrom and out of contact with the standing valve when the latter is seated, and said yoke being of a length to permit of both the seating and the unseating of the said standing valve, and a threaded stem extending through the top of the cage for the standing valve and threadedly engaging the yoke and said element designed to be turned when the traveling valve is lowered and the jaw thereon is brought to engage with the head of the said threaded element, and the sucker rod for the traveling valve is turned and whereby to move the yoke longitudinally in the cage to raise and hold the traveling valve above its seat.

2. An oil well pump, including a standing valve and a traveling valve, said standing valve including a cage having openings in the sides thereof, a ball valve normally seated in the cage, an element in the cage disposed over the ball valve, guide means between the element and the cage, a screw member threadedly engaging the element and extending through the top of the cage, and means on the lower end of the traveling valve engageable with the said end of the screw member for turning the same to cause a longitudinal movement of the element to bring the latter away from or in contact with the ball valve to hold the latter seated.

In testimony whereof I affix my signature.

WILLIAM P. CAPPS.